UNITED STATES PATENT OFFICE.

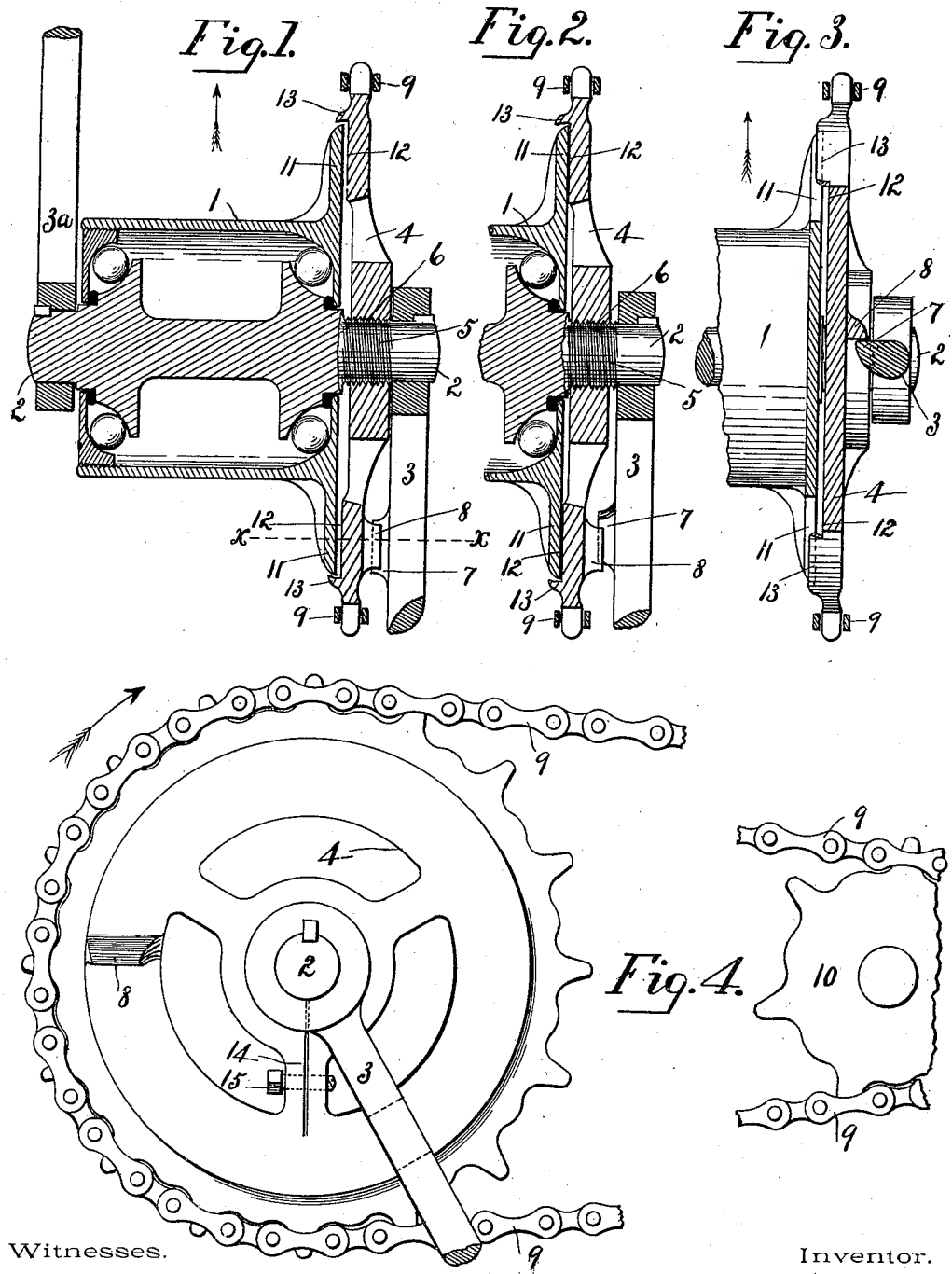

FISHER H. LIPPINCOTT, OF PHILADELPHIA, PENNSYLVANIA.

BACK-PEDALING BRAKE.

SPECIFICATION forming part of Letters Patent No. 629,514, dated July 25, 1899.

Application filed October 7, 1896. Serial No. 608,091. (No model.)

*To all whom it may concern:*

Be it known that I, FISHER H. LIPPINCOTT, a citizen of the United States, residing at the city and county of Philadelphia, in the State of Pennsylvania, have invented certain new and useful Improvements in Braking Mechanism for Bicycles, of which the following is a full, clear, and exact description, reference being had to the accompanying drawings, of which—

Figure 1 is a medial horizontal longitudinal section through the hub and driving sprocket-wheel of a bicycle to which my invention is applied, the brake being out of action. Fig. 2 is a similar section, the pedal-arm and sprocket-wheel shaft being broken away and the brake in action. Fig. 3 is a full vertical section on line $x\ x$, Fig. 1, looking in the direction of the arrow, the hub, &c., being broken away. Fig. 4 is a full side elevation of the sprocket-wheel, &c.

This invention relates to that class of bicycles, ordinarily known as "safety-bicycles," which are driven by foot-power applied to pedals through the medium of an endless chain running over sprocket-wheels.

The general nature of the invention is an automatic brake device which is brought into braking action by "back-pedaling" of the machine; but it is brought and remains out of action when the machine is being driven forward.

The invention consists in the novel construction and combination of parts, all substantially as hereinafter described and pointed out in the appended claim.

Referring to the accompanying drawings, forming a part of this specification, in which are omitted well-known parts of a bicycle of the class recited except such as I deem necessary to a full understanding of my invention, 1 marks the usual hub of the bicycle, through which passes the rotatable shaft 2, to the projecting ends of which the pedal-arms 3 $3^a$ and driving sprocket-wheel 4 are attached.

In carrying out my invention I provide a right-hand screw-thread 5 of any desired pitch upon that part of the shaft 2 between the hub 1 and the hub of the pedal-arm 3 adjacent to the sprocket-wheel, the shaft-receiving aperture of the wheel-hub having a corresponding screw-thread 6, whereby the wheel may be screwed onto the shaft.

The width of the wheel-hub is less than the interval between the hub 1 and the hub of pedal-arm 3. Thus the wheel when rotated may travel to and fro a limited distance upon the shaft.

From the inner side of pedal-arm 3 projects a lug 7, and from the adjacent side of the sprocket-wheel projects a lug 8, whose end extends beyond the end of lug 7, as clearly seen in Figs. 1, 2, and 3. Now when the bicycle is being pedaled forward, the wheel being then at the outward position on its shaft, as in Fig. 1, and the lug 7 being in engagement with lug 8, it (the wheel) will be carried around as if it were fixed on the shaft. When, however, the machine is back-pedaled, the sprocket-chain 9 will be driven by the rear sprocket-wheel 10, Fig. 4, and the wheel 4, being free to rotate forward—that is, in the direction of the arrows in Figs. 1, 3, and 4—is carried or screwed laterally and inwardly on its shaft until it comes into contact with the hub 1, thereby braking the wheel, and consequently checking the speed of the bicycle. In order to obtain a considerable or sufficient friction between the said sprocket-wheel and the hub 1, I usually widen the adjacent end of the latter into a peripheral flange 11 and provide the opposed side of the wheel with a corresponding annular plane surface 12.

I sometimes in order to protect the frictional surfaces from dirt provide an annular flange 13 on the inner side of the sprocket-wheel 4 that projects beyond both surfaces.

When it is desired to release the brake, the forward pedaling is resumed, whereupon the lug 7 of the pedal-arm 3 will engage the lug 8 of the sprocket-wheel, and the latter will in its enforced rotation "unscrew," so to say, away from contact with the hub 1 and finally return to the first or normal position against the hub of the pedal-arm.

As a means to regulate or control the ease or quickness of the lateral movement of the sprocket-wheel upon the shaft I split the hub of the wheel and also one of its arms 14, as seen in Fig. 4, and by means of a screw through bolt 15 the wheel-hub may be contracted or expanded to bind more or less closely upon the shaft. Of course the more tightly it binds the more power is required to cause the lateral movement or screwing of the wheel. Other means for securing this adjustment may be substituted.

Having thus described my invention, I claim as new and desire to secure by Letters Patent—

In a brake mechanism for bicycles or other velocipedes of the class recited, the combination of the pedal-arm and its shaft, the sprocket-wheel screwed on said shaft, and having a split hub and arm the clutch device connecting the pedal-arm and wheel, a suitable frictional surface adjacent to the wheel whereby when the bicycle is pedaled forward the said wheel will be carried around by the rotation of the pedal-arm, and when the bicycle is back-pedaled, the wheel be rotated by the movement of the sprocket-chain, and at the same time be caused to move laterally on the shaft, by the screw-thread into contact with said frictional surfaces; together with means for adjusting the split portion of said sprocket-wheel to thereby regulate the degree of friction of the sprocket-wheel upon its shaft, substantially as and for the purpose set forth.

In testimony whereof I have hereunto affixed my signature in the presence of two subscribing witnesses.

FISHER H. LIPPINCOTT.

Witnesses:
 WALTER C. PUSEY,
 JOSHUA PUSEY.